(12) United States Patent
Zeman et al.

(10) Patent No.: US 12,325,403 B2
(45) Date of Patent: Jun. 10, 2025

(54) BRAKE SYSTEM FOR COMMERCIAL VEHICLE

(71) Applicant: KNORR-BREMSE Systeme fuer Nutzfahrzeuge GmbH, Munich (DE)

(72) Inventors: Ferenc Zeman, Budapest (HU); Zoltan Bordacs, Budapest (HU); Imre Zeman, Budapest (HU); Sandor Pallag, Diosd (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/641,745

(22) PCT Filed: Sep. 1, 2020

(86) PCT No.: PCT/EP2020/074309
§ 371 (c)(1),
(2) Date: Mar. 9, 2022

(87) PCT Pub. No.: WO2021/047946
PCT Pub. Date: Mar. 18, 2021

(65) Prior Publication Data
US 2022/0324424 A1 Oct. 13, 2022

(30) Foreign Application Priority Data
Sep. 9, 2019 (EP) .................... 19196088

(51) Int. Cl.
*B60T 8/32* (2006.01)
*B60T 8/36* (2006.01)
*B60T 8/48* (2006.01)

(52) U.S. Cl.
CPC ............ *B60T 8/327* (2013.01); *B60T 8/3605* (2013.01); *B60T 8/361* (2013.01); *B60T 8/4818* (2013.01)

(58) Field of Classification Search
CPC ........ B60T 8/327; B60T 8/3605; B60T 8/361; B60T 8/4848; B60T 8/32; B60T 8/34; B60T 8/88; B60T 8/92; B60T 2270/402
See application file for complete search history.

(56) References Cited

U.S. PATENT DOCUMENTS 6,598,943 B2 * 7/2003 Harris ................ B60T 8/94
303/3
10,293,799 B2 * 5/2019 Beauvais ............... B60T 8/171
(Continued)

FOREIGN PATENT DOCUMENTS

CN 101939199 A 1/2011
CN 102923109 A 2/2013
(Continued)

OTHER PUBLICATIONS

International Search Report (PCT/ISA/210) issued in PCT Application No. PCT/EP2020/074309 dated Nov. 4, 2020 (two (2) pages).
(Continued)

*Primary Examiner* — Thomas J Williams
(74) *Attorney, Agent, or Firm* — Crowell & Moring LLP

(57) ABSTRACT

A brake system for a motor vehicle, particularly a commercial vehicle, includes at least one electronic control unit, at least one parking brake device, and at least one wheel-blocking detection device. The wheel-blocking detection device is configured to: detect at least one blocking condition of one or more wheels of the motor vehicle, generate at least one blocking condition signal in response to the detected blocking condition, and transmit the blocking condition signal to the electronic control unit. The electronic control unit is configured to control the parking brake device such that, in a moving condition of the motor vehicle, at least one gradual actuation of the parking brake device is reduced or stopped if the blocking condition signal is generated.

12 Claims, 2 Drawing Sheets

(56) References Cited

U.S. PATENT DOCUMENTS

| | | | |
|---|---|---|---|
| 2008/0030068 A1* | 2/2008 | Bensch | B60T 13/04 |
| | | | 303/17 |
| 2009/0280959 A1 | 11/2009 | Bensch et al. | |
| 2011/0005874 A1 | 1/2011 | Beier et al. | |
| 2011/0012421 A1 | 1/2011 | Bensch et al. | |
| 2014/0110999 A1* | 4/2014 | Eberling | B60T 17/221 |
| | | | 303/122 |
| 2015/0019101 A1* | 1/2015 | Bajorat | B60T 13/662 |
| | | | 701/71 |
| 2015/0266457 A1* | 9/2015 | Johnson | B60T 7/042 |
| | | | 303/15 |
| 2018/0208166 A1* | 7/2018 | Eckert | B60T 8/327 |
| 2019/0152459 A1* | 5/2019 | Dieckmann | B60T 13/662 |
| 2022/0324424 A1* | 10/2022 | Zeman | B60T 8/3605 |

FOREIGN PATENT DOCUMENTS

| | | | | |
|---|---|---|---|---|
| CN | 103863293 A | 6/2014 | | |
| DE | 199 42 533 A1 | 11/2000 | | |
| DE | 10 2004 012 684 A1 | 4/2005 | | |
| DE | 10 2005 024 342 A1 | 1/2006 | | |
| DE | 10 2008 009 882 A1 | 8/2009 | | |
| EP | 2077215 A1 * | 7/2009 | | B60T 13/686 |
| EP | 2108554 A1 * | 10/2009 | | B60T 13/662 |
| EP | 3 315 369 A1 | 5/2018 | | |
| GB | 2 349 676 A | 11/2000 | | |
| KR | 10-2013-0024176 A | 3/2013 | | |
| SE | 0701777 L | 2/2008 | | |
| WO | WO 2008/025404 A1 | 3/2008 | | |
| WO | WO 2009/086855 A1 | 7/2009 | | |
| WO | WO 2009/103330 A1 | 8/2009 | | |
| WO | WO 2014/173605 A1 | 10/2014 | | |

OTHER PUBLICATIONS

Extended European Search Report issued in European Application No. 19196088.9 dated Feb. 11, 2020 (eight (8) pages).
Cover Page of EP 2 229 302 A1 published Sep. 22, 2010 (one (1) page).
Cover Page of EP 2 244 919 A1 published Nov. 3, 2010 (one (1) page).
Cover Page of EP 2 059 428 A1 published May 20, 2009 (one (1) page).
Written Opinion (PCT/ISA/237) issued in PCT Application No. PCT/EP2020/074309 dated Nov. 4, 2020 (six (6) pages).
Chinese-language Office Action issued in Chinese Application No. 202080063096.X dated Mar. 11, 2023 with English translation (16 pages).

* cited by examiner

BRAKE SYSTEM FOR COMMERCIAL VEHICLE

BACKGROUND AND SUMMARY

The present invention relates to a brake system for a motor vehicle, especially a commercial vehicle, wherein the brake system comprises at least one electronic control unit, at least one parking brake device, and at least one wheel-blocking detection device.

Further, the present invention relates to a method for operating such a brake system for a motor vehicle.

So far, conventional and/or electronic parking brake systems are not considering the wheel blocking situation in case of graduable braking. In the prior art, the parking brake gradual demand or request signal of the driver for example is executed independently of the wheel blocking situation. If the parking brake device is needed to be actuated to decelerate the vehicle there is a high risk to loose vehicle stability due to blocking of the wheels. The invention is to reduce or completely abort parking brake graduable actuation, if a possible wheel blocking situation is detected, as an anti-blocking functionality in case of a gradual actuation of the parking brake.

EP 2229302 A1 shows a braking system for a vehicle, particularly a commercial vehicle, which includes an operating brake device for providing an operating brake function for braking the vehicle, and a parking brake device for providing a parking brake function independently of the operating brake system. If one of the two braking devices partially or completely fails, the vehicle can be braked automatically by means of the other braking device.

EP 2244919 A1 discloses a parking brake of a brake system for a vehicle including an anti-lock device, which, based on a signal that is dependent on the rotational speed of the vehicle engine, transmission, or drive shaft, prevents blocking or excess slippage of a wheel that can be decelerated by the parking brake.

EP 2059428 A1 discloses a pneumatic vehicle brake system includes first and second groups of wheel brakes belonging, respectively, to first and second brake circuits having first and second compressed air storage tanks for providing first and second stored pressures. At least one first circuit brake cylinder is a combined spring-store/diaphragm cylinder with a spring store part for providing a parking brake and a diaphragm part for providing a service brake. If the first circuit fails, the spring store part is deaerated to engage the parking brake.

WO 2014/173605 A1 relates to a method for controlling a parking brake of a vehicle having the parking brake and a service brake, which is designed to brake the vehicle on the basis of a brake request, the method comprising the following steps: —putting the parking brake into a readiness state when a functional state of the service brake is faulty, and —actuating the parking brake during travel of the vehicle on the basis of the brake request when the parking brake is in the readiness state.

EP 2108554 A1 shows a method that involves determining the braking forces applied by parking brake actuator of a parking brake by an antilock braking system servo loop. The parking brake actuator is operated according to the defined braking forces to be applied. The parking brake aids a braking of the commercial vehicle in the case of a defect of a main brake. An independent claim is included for a brake system with a parking brake cylinder.

DE 19942533 A1 discloses a parking brake device having an operating element to operate the wheel brake devices. It includes a blocking protection control device for the parking brake, controls the wheel brake devices depending on wheel revs. monitored by a sensor, so that a blocking of the wheels can be prevented.

EP 3315369 A1 further shows an apparatus for controlling a traction of a vehicle, wherein the vehicle comprises a parking brake system with a spring-loaded brake cylinder operable to release the parking brake against a spring force using pressurized air and the parking brake system is configured to brake one or more driven wheels of the vehicle.

The brake systems of the prior art as mentioned above do not take into account the blocking situation during graduable braking of the parking brake device. Therefore, a higher risk of the commercial vehicle's safety situation during graduable braking still occurs. Thus, a need for further increasing the safety of the vehicle, especially a commercial vehicle, still exists.

It is therefore an object of the present invention to improve a brake system for a motor vehicle, especially a commercial vehicle, in particular in that the safety of the vehicle during at least one brake operation of the parking brake is increased.

This object is solved according to the present invention with a brake system for a motor vehicle, especially a commercial vehicle, according to the features of the independent claim. Correspondingly, a brake system for a motor vehicle, especially a commercial vehicle, is provided, wherein the brake system comprising at least one electronic control unit, at least one parking brake device, and at least one wheel-blocking detection device; wherein the wheel-blocking detection device is configured to: detect at least one blocking condition of one or more wheels of the motor vehicle, generate at least one blocking condition signal in response to the detected blocking condition, and transmit the blocking condition signal to the electronic control unit; wherein the electronic control unit is configured to control the parking brake device such that, in a moving condition of the motor vehicle, at least one gradual actuation of the parking brake device is reduced or stopped if the blocking condition signal is generated.

The invention is based on the basic idea that, during graduable braking actuation of the parking brake device, an anti-blocking function or controlling routine performed by the control unit is provided in order to increase the vehicle safety especially during graduable braking. The graduable braking mode may also be identified as a secondary braking mode or function. The main benefit of this anti-blocking function is to keep vehicle stability during secondary braking via parking brake. For example, if the driver gradually actuates the parking brake for auxiliary brake reasons, the driver, in an emergency situation, sometimes fails to decrease the graduable actuation of the parking brake resulting in an unsafe vehicle condition, which is a potentially source of severe accidents. The vehicle is preferably a commercial vehicle also called as an utility vehicle. In other words, the present invention merges the well-known anti-blocking functionality commonly used during unsafe service brake operations and the gradual parking brake function. It has to be stated that the term gradual actuation of the parking brake device should be understood as an applying of a gradually increasing or decreasing braking force generated by one or more spring brake actuators or cylinders resulting in a defined deceleration of the motor vehicle. This braking force is generated by gradually venting of the spring brake cylinders of the vehicle. The parking brake device itself may be set up like a parking brake device well known in the prior art, for example in EP 3315369 A1 and EP 2108554 A1, whose teachings are incorporated herewith. Particularly, the parking brake device is set up as a pneumatic or electro-pneumatic parking brake. Additionally, the electronic control unit may be further configured to control the parking brake device such that, in a moving condition of the motor vehicle, at least one gradual actuation of the parking brake device is reduced or stopped if a slip signal is generated. This slip signal may also be detected and generated by the wheel-blocking detection device.

In particular, the brake system further comprises at least one service brake device, wherein the electronic control unit is configured to reduce or stop the gradual actuation of the parking brake device while the electronic control unit is further configured to activate at least one automatic parking brake device blending function together with the service brake device. The service brake device itself may be set up like a well known service brake device in the prior art, for example in EP 3315369 A1 and EP 2108554 A1, whose teachings are incorporated herewith. The blending function enables a highly functionally integrated brake system providing synergistic advantages of the control of the service brake as well of the parking brake in view of less parts to be used (e.g. control valves, pressure sensors, or electric and pneumatic circuitry) or more functions to be executed with an existing brake system infrastructure. Consequently, with such an automatic parking brake device blending function, it is much easier to achieve the required secondary brake performance in form the control of the gradual actuation of the parking brake. In such a situation, during an anti-blocking operation of the service brake device, the parking brake device may be controlled in response to the anti-blocking operation of the service brake device. Particularly, the service brake device is set up as a pneumatic or electro-pneumatic service brake.

Additionally, the electronic control unit is configured to control the gradual actuation based on at least one service brake pedal position signal. This kind of control enables a very precise control function of the gradual parking brake function as the service brake pedal position relates to a very precisely sensed signal that may be advantageously be provided to the electronic control unit. The provision of this signal may be realised by the CAN system of the brake system and/or the commercial vehicle. Further, this kind of control enables an automatic control function of the gradual parking in response to the service brake pedal position signal. It is conceivable that, during a detected blocking situation, the gradual actuation of the parking brake device is controlled inversely proportional to the service brake pedal position signal. That is, the more the driver actuates the service brake pedal, the more gradual actuation of the parking brake device is reduced or even stopped if a service brake pedal position signal threshold is detected. Other types of control contexts are also possible in this context.

In particular, the electronic control unit is configured to control the gradual actuation based on the service brake pedal position signal if at least one circuit of the service brake device is defected. In this case, an additional brake force or effect is needed in order to decelerate the commercial or utility vehicle as fast as possible since the defect of at lase one circuit of the service brake is a very critical situation that has to be eliminated as soon as possible. Therefore, the generation of the additional secondary brake force by the gradual actuation of the parking brake, dependent of a potential blocking condition, increases the overall vehicle security together with the advantages as described in connection with the advantages based on using the service brake pedal position signal above.

Otherwise, the wheel-blocking detection device is configured to detect the blocking condition based on at least one direct request provided by at least one sub-system of the motor vehicle. All sub-systems of the motor vehicle being directly or indirectly influenced by the blocking condition of one or more wheels or directly or indirectly indicative of such a blocking condition may be suitable to provide such a request or demand in the form of an associated signal. Such a demand provides an even more precise and especially redundant way to control the anti-blocking function of the gradual parking brake if the blocking detection device is defected for example. Such sub-systems of the motor vehicle may be at least one of a suspension system, an air spring system, electronic stability control system, and anti-skid control system and systems of the powertrain.

Further, the wheel-blocking detection device is configured to detect the blocking condition based on a general anti-blocking system signal ABS provided by the service brake device. This kind of detection ensures a very effective, simple, and precise way of controlling the gradual actuation of the parking brake device together with the blocking signal as generated additionally. Especially the overall wheel blocking situation is enhanced since the anti-blocking information related to the service brake device is merged together with that one of the parking brake resulting in an even better anti-blocking control of the parking brake device and/or service brake device.

In particular, the wheel-blocking detection device is configured to detect the blocking condition based on an anti-blocking system signal ABS of at least one axle of the motor vehicle provided by the service brake device. Compared to the blocking condition based on a general anti-blocking system signal ABS, the assigned anti-blocking signal of at least one axle of the motor vehicle results in a more simple design of the brake system leading to more cost competitiveness and less overall system complexity. Also, a faster signal processing by the control unit may be provided due to the purposely restricted anti-blocking system signals or data. It is further conceivable that wheel-blocking detection device is configured to detect the blocking condition based on an anti-blocking system signal ABS of two axles or three axles of the commercial vehicle.

Further, the wheel-blocking detection device is configured to detect the blocking condition based on at least one speed value of the one or more wheels of the motor vehicle. The speed value of one or more wheels is a very precisely and dynamically sensed value as the normal set up for sensing such values is a speed sensor associated to every single wheel of the commercial vehicle. Therefore, a wheel-dissolved anti-blocking signal may be detected this way leading to a very fast reaction routine performed by the electronic control unit according to one distinct wheel or distinct groups of wheels for example on a common axle or vehicle side. Additionally or alternatively, the rotational speed of the vehicle's engine or other systems of the powertrain may be also taken into account by the wheel-blocking detection device in order to improve the control of the anti-blocking control of the gradual actuation of the parking brake.

Especially, the electronic control unit is configured to completely stop the gradual actuation of the parking brake device if the blocking condition signal is generated. Such a case occurs if the blocking condition signal exceeds a specific signal threshold at which the actuation of the gradual parking brake is not possible any more in terms of an overall vehicle safety situation. This case occurs in critical vehicle situations at which the anti-blocking control of the service brakes without secondary braking of the gradual actuation of the parking brake device results in a safer situation of the vehicle. The specific signal threshold may be determined by the control unit in answer to an assessing procedure or routine of the input parameters (as described above) provided to it.

Further, the electronic control unit is configured to reduce the gradual actuation of the parking brake device below a gradual actuation threshold if the blocking condition signal is generated. Such a reduction permits a further reduced gradual actuation of the parking brake device while the blocking condition of at least one wheel has/have been still occurred. Thus, in situations in which a gradual actuation is still acceptable under a certain actuation threshold, the additional gradual auxiliary brake force my be still provided resulting in a higher vehicle safety although the vehicle is already in a wheel-blocking condition. The main benefit of this function is the generation of an additional anti-blocking gradual brake actuation even under anti-blocking condition of the service brake resulting in a higher overall brake effect on the commercial vehicle.

Moreover, the electronic control unit is configured to reduce or stop the gradual actuation of the parking brake device if the blocking condition signal is generated and if the electronic control unit, by its parking brake device blending function, is configured to automatically control the gradual actuation of the parking brake device in case of secondary braking. As mentioned above, the blending function enables a highly functionally integrated brake system providing synergistic advantages of the automatic control of the service brake as well of the parking brake in view of less parts to be used (e.g. control valves, pressure sensors, or circuitry) or more functions to be executed with an existing brake system infrastructure. Consequently, with such an automatic parking brake device blending function, it is much easier to achieve the required secondary brake performance in form reducing or stopping the gradual actuation of the parking brake device of the gradual actuation of the parking brake.

Besides, the electronic control unit is configured to reduce or stop the gradual actuation of parking brake device if the blocking condition signal is generated and if the gradual actuation of the parking brake device is controlled by a driver of the motor vehicle. The control of the brake system during normal environmental condition of the vehicle is normally acceptable. Another situation occurs under unnormal environmental conditions like heavy rain, snow, fog, wind, hail, and slippery roads due to ice and/or snow. Under these conditions it is not ensured that all drivers behave in an optimally adapted manner according to the respective situation. Therefore, it is necessary to control and if appropriate to override the driver requests in order to maximise the vehicle safety. Therefore, it is advantageous to reduce or stop the gradual actuation of parking brake device if the blocking condition signal is generated and if the gradual actuation of the parking brake device is controlled by a driver in an unsafe manner. Such an unsafe manner may be detected for example by assessing the service brake pedal position signal or a gradual brake actuation position signal in relation to other parameters of the vehicle and/or the brake system.

In particular, the electronic control unit is configured to reduce or stop the gradual actuation of parking brake device if the blocking condition signal is generated and if the sub-system of the motor vehicle is configured to request at least one gradual actuation of the parking brake device. This way of gradual brake control offers another possibility to increase the overall safety situation of the vehicle since the more significant vehicle information (here provided by a sub-system) are available the more opportunities are available for the control unit to control the parking brake device in an appropriate manner, especially under the blocking condition of at least one wheel.

Moreover, the electronic control unit can be configured to control the parking brake device based on the configuration of the spring chambers of the vehicle, wherein the electronic control unit is further configured to reduce and/or stop gradual actuation of the parking brake device only if a blocking is detected for a wheel and/or axle equipped with a spring chamber. In other words, the electronic control unit can be configured to control the parking brake considering the configuration of spring chambers on the vehicle. The electronic control unit can reduce or stop the gradual actuation only if a blocking is detected with respect to an axle and/or a wheel for those wheel(s) or axle(s), where spring chambers and/or combi cylinders are used, i.e. where the gradual actuation of the parking brake device is effective.

Further, the present invention also relates to a method for operating of at least one brake system for a motor vehicle as mentioned above, especially commercial vehicle, the brake system comprising at least one parking brake device, wherein the method comprising the following steps:

Detecting at least one blocking condition of one or more wheels of the motor vehicle;

Generating at least one blocking condition signal in response to the detection of the blocking condition; and Controlling of at least one gradual actuation of parking brake device such that, in a moving condition of the motor vehicle, the gradual actuation of parking brake device is reduced or stopped if the blocking condition signal is generated.

All the structural and functional features associated with the inventive braking system as mentioned above and its embodiments may also be included in the inventive method for operating of at least one of such a brake system, either alone or in combination, and the associated advantages may be obtained.

Additionally, the brake system as mentioned above is configured to perform this method according to its above-mentioned steps.

Further details and advantages of the present invention shall now be disclosed in connection with the drawings.

DETAILED DESCRIPTION OF THE DRAWINGS

Figure 1:
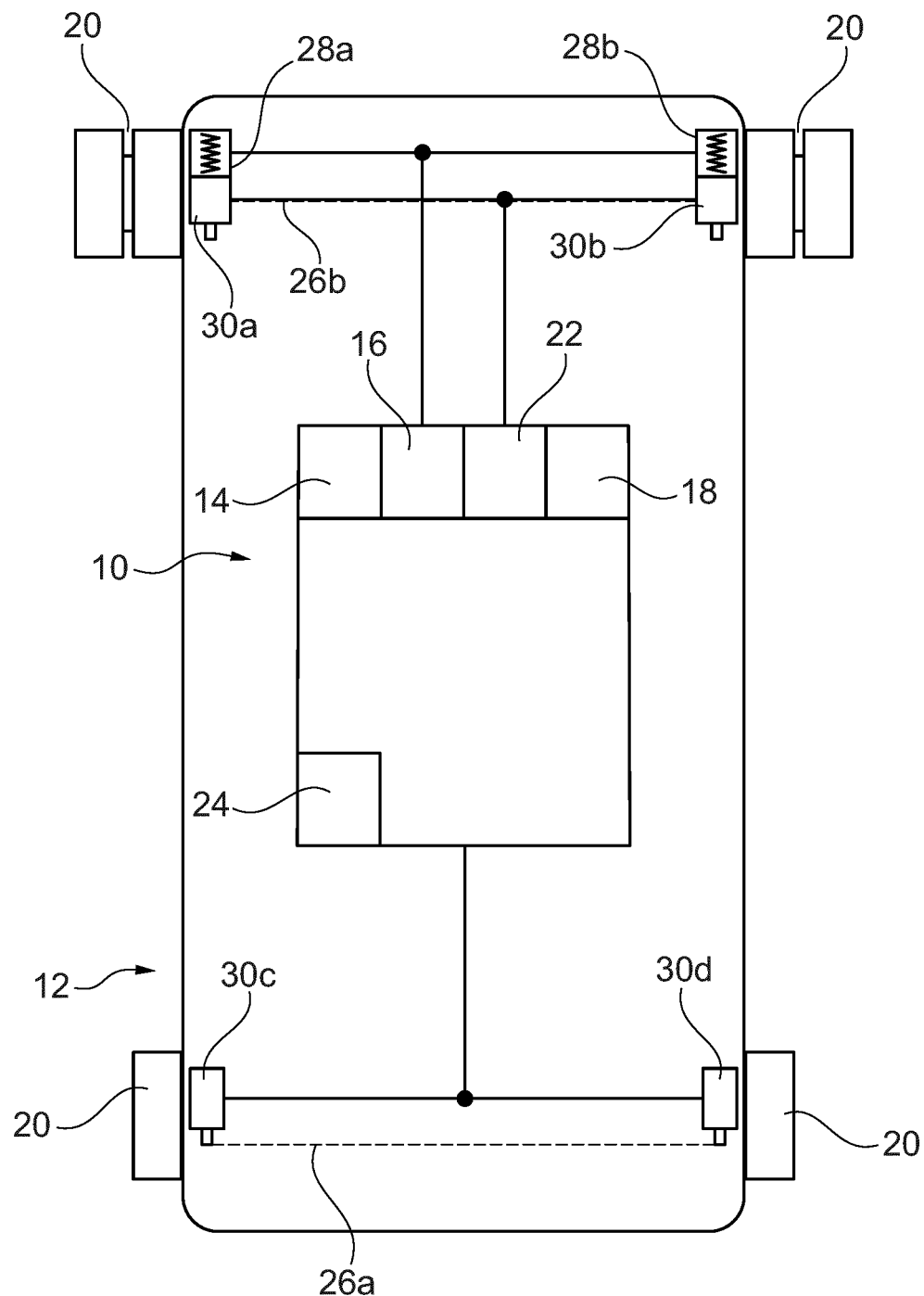
FIG. 1 is a schematic top view of a first embodiment of a brake system for a motor vehicle according to the present invention.

FIG. 1 shows a schematic top view of a first embodiment of a brake system 10 for a motor vehicle 12. The brake system 10 for a motor vehicle 12 is formed as a brake system for a commercial or utility vehicle 12. Alternatively, the brake system 10 may also be formed for other vehicles.

The brake system 10 comprises an electronic control unit 14, a parking brake device 16, and a wheel-blocking detection device 18. The electronic control unit 14 is a closed-loop electronic control unit 14. Alternatively or additionally, the electronic control unit 14 is a open-loop electronic control unit 14.

Further, the brake system 10 comprises a service brake device 22 and another sub-system 24 that may be part of the of the brake system 10.

The parking brake device 16 and the service brake device 22 are build-up as pneumatic devices or electro-pneumatic devices.

The electronic control unit 14 may also be part of another vehicle system like the service brake system 22 or the sub-system 24.

Such sub-systems 24 of the motor vehicle may be at least one of a suspension system, an air spring system, electronic stability control system, and anti-skid control system and systems of the powertrain.

The commercial vehicle 12 also comprises two axles 26, wherein one axle is built-up as a front axle 26a and another axle 26 is built-up as a rear axle 26b.

It is also contemplated that the commercial vehicle 12 comprises more than two axles 26.

According to FIG. 1, the commercial vehicle is expressed as a towing commercial vehicle 12, but this towing vehicle may also be combined with one or more trailer vehicles (not shown in FIG. 1).

According to FIG. 1, the brake system 10 is formed as a brake unit or module.

Alternatively, the electronic control unit 14, the parking brake device 16, the wheel-blocking detection device 18, the service brake device 22, and/or the sub-system 24 may also be formed as separate modules. Thus, these separate modules 14, 16, 18, 22, and 24 are connected to each other via appropriate interfaces and mechanical, electrical and pneumatic connecting elements like mechanical fastening members, pneumatic and electrical lines, each well known by the person skilled in the art.

The parking brake device 16 is connected to two spring brake actuators 28a, 28b located at the rear axle 26b via a first parking brake pneumatic line.

Alternatively, it is also possible that two additional spring brake actuators (not shown in FIG. 1) are located at the front axle 26a connected to the parking brake device 16 via a second parking brake pneumatic line.

Also, the service brake device 22 is connected to four service brake actuators 30a, 30b, 30c, 30d being located at the front and rear axle 26a, 26b via a first and second service brake pneumatic line.

Additionally, the function of the brake system 10 as shown in FIG. 1 is as follows.

First, the wheel-blocking detection device 18 is configured to detect a blocking condition of one or more of the four wheels 20 as shown in FIG. 1. Having detected such a blocking condition, the wheel-blocking detection device 18 generates a blocking condition signal in response to the detected blocking condition. Such a blocking condition may be detected by the wheel-blocking detection device 18 in several different ways as mentioned below.

According to a first detection way, the wheel-blocking detection device 18 is configured to detect the blocking condition based on a direct request signal provided by the sub-system 24 of the motor vehicle 12. In this context, particularly those sub-systems 24 as mentioned above that are directly or indirectly influenced by the blocking condition of one or more wheels 20 or that are directly or indirectly indicative of such a blocking condition may be suitable to provide such a request or demand signal according to which the wheel-blocking detection device 18 is able to detect a blocking condition. In any case, such a sub-system 24 should be configured, by appropriate sensing and processing elements, to detect directly or indirectly a vehicle or wheel condition that is indicative of such a blocking condition.

According to a second detection way, wheel-blocking detection device 18 is configured to detect the blocking condition based on a general anti-blocking system signal ABS provided by the service brake device 22. The generation of the anti-blocking system signal ABS as well as the anti-blocking function are performed by the service brake device 22 according to methods and techniques being well known by the person skilled in the art. In this context, often vehicle wheel speed sensors (not shown in FIG. 1) in connection with an appropriate processing and a control unit of the service brake device are used in order to generate such an anti-blocking system signal ABS.

According to a third detection way, the wheel-blocking detection device 18 is configured to detect the blocking condition based on an anti-blocking system signal ABS the front axle 26a of the commercial vehicle 12 provided by the service brake device 22. In this context, an additional detection of the blocking condition based on an anti-blocking system signal ABS of the rear axle 26b is also possible.

According to a fourth detection way, the wheel-blocking detection device 18 is configured to detect the blocking condition based on a speed value of the wheels 20. As mentioned above, the rotational speed of all wheels 20 is detected by a rotational speed sensor being part of the wheel-blocking detection device 18. One rotational speed sensor is associated to each wheel 20 and is configured to transmit the detected rotational speed signals to the wheel-blocking detection device 18 forming the basis of an assessment of a potential wheel blocking condition resulting in a generation of a blocking condition signal.

Once the blocking condition signal is generated as explained above, it is transmitted to the electronic control unit 14 where it is processed for controlling the parking brake device 16. This transmission of the blocking condition signal is performed according to methods and techniques being well known by the person skilled in the art such as a CAN bus or other appropriate communication and transmission systems. If such a blocking condition signal is generated, the electronic control 14 unit is configured to control the parking brake device 16 such that, in a moving condition of the motor vehicle 12, gradual actuation of the parking brake device 16 is reduced or stopped.

The control of the gradual actuation of the parking brake device 16 by the electronic control unit 14 may be performed in different ways as mentioned below.

The control of the gradual actuation of the parking brake device 16 in general is performed according to methods and techniques being well known by the person skilled in the art.

According to a first controlling way, the electronic control unit 14 is configured to control the gradual actuation based on a service brake pedal position signal. This service brake position signal is transmitted to the control unit 14 for example over the CAN bus of the commercial vehicle 12.

According to a second controlling way, the electronic control unit 14 is particularly configured to control the gradual actuation based on the service brake pedal position signal if a circuit or the first or second service brake line as mentioned above is defected.

According to a third controlling way, the electronic control unit 14 is configured to completely stop the gradual actuation of the parking brake device 16 if the blocking condition signal is generated. This control strategy is applied if the overall safety situation of the commercial vehicle 12 is adversely affected by a gradual actuation of the parking brake device According to a fourth controlling way, the electronic control unit 14 is configured to reduce the gradual actuation of the parking brake device 16 below a gradual actuation threshold if the blocking condition signal is generated. Such a reduction permits a reduced gradual actuation of the parking brake device 14 while the blocking condition of at least one wheel 20 has been still occurred. Thus, in situations in which a gradual actuation is still acceptable under a certain actuation threshold, the additional gradual auxiliary brake force my be still provided resulting in a higher vehicle safety although the vehicle is already in an at least partly wheel-blocking condition. Therefore, a further possibility during an anti-blocking mode of the service brake device 22 is provided. Thus, an appropriate additional anti-blocking gradual brake actuation even under anti-blocking condition of the service brake device 22 is possible resulting in a higher overall brake effect on the commercial vehicle 12.

According to a fifth controlling way, the electronic control unit 14 is configured to reduce or stop the gradual actuation of parking brake device 16 if the blocking condition signal is generated and if the gradual actuation of the parking brake device 16 is controlled by a driver of the motor vehicle 12. For example, if the driver gradually actuates the parking brake for auxiliary brake reasons, in an emergency situation and due to stress, the driver sometimes fails to decrease the graduable actuation of the parking brake device resulting in an unsafe vehicle condition, which is a potentially source of severe accidents. Such an unsafe situation may be detected by the wheel blocking detection device 18 by assessing the service brake pedal position signal or a gradual brake actuation position signal in relation to other parameters of the vehicle and/or the brake system.

According to a sixth controlling way, the electronic control unit 14 is configured to reduce or stop the gradual actuation of parking brake device 16 if the blocking condition signal is generated and if the sub-system 24 of the motor vehicle 12 is configured to request at least one gradual actuation of the parking brake device 16.

As mentioned above, the wheel-blocking detection device 18 is configured to detect the blocking condition based on a direct request signal provided by the sub-system 24 of the motor vehicle 12.

All sub-systems being directly or indirectly influenced by the blocking condition of one or more wheels 20 or directly or indirectly indicative of such a blocking condition may be suitable to provide such a request or demand signal to the wheel-blocking detection device 14.

According to further blending function controlling ways, the electronic control unit 14 is configured to reduce or stop the gradual actuation in the context of an automatic blending function of the parking brake device 16 together with the service brake device 22.

Particularly, the electronic control unit 14 is configured to reduce or stop the gradual actuation of the parking brake device 16 while it is further configured to activate at least one automatic parking brake device 16 blending function together with the service brake device 22.

More particularly, the electronic control unit 14 is configured to reduce or stop the gradual actuation of the parking brake device 16 if the blocking condition signal is generated and if it is, by its parking brake device blending function, configured to automatically control the gradual actuation of the parking brake device 16 in case of secondary braking.

Also, the electronic control unit 14 is configured to control the parking brake device 16 based on the configuration of the spring chambers of the vehicle, wherein the electronic control unit 14 is further configured to reduce and/or stop gradual actuation of the parking brake device 16 only if a blocking is detected for a wheel and/or axle equipped or connected with a spring chamber.

These functions as described above in view of the commercial vehicle 12 may be also associated with a comparable brake system of at least one trailer (not shown in FIG. 1) coupled to the commercial vehicle.

Figure 2:
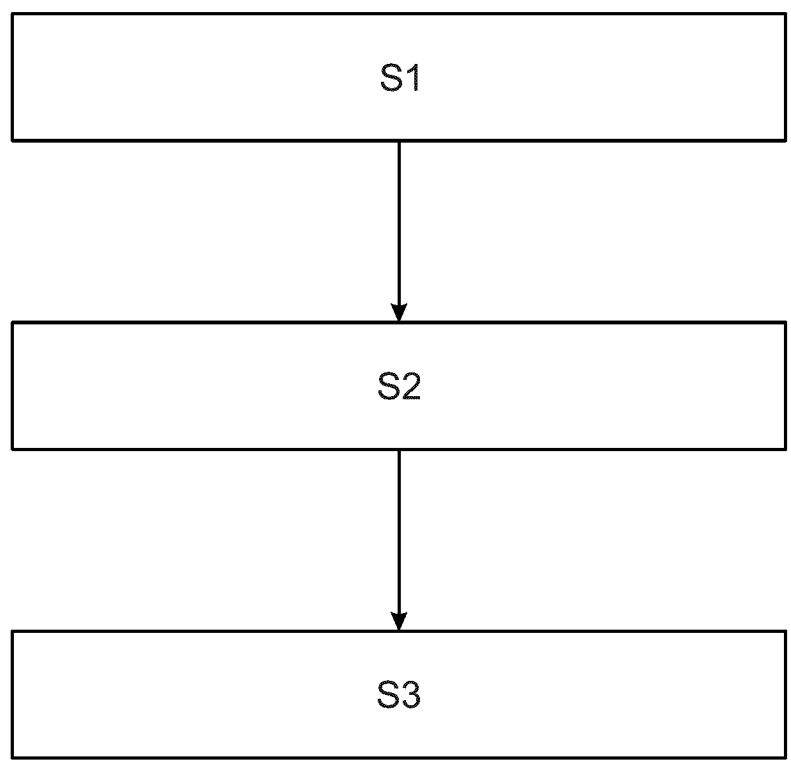
FIG. 2 is a schematic flow chart of an exemplary method according to the invention for operating the brake system according to FIG. 1.

FIG. 2 shows a schematic flow chart of the method for operating the brake system 12 according to FIG. 1.

This method comprises the following steps. In a first step S1, one blocking condition of one or more wheels 20 of the motor vehicle 12 is detected. According to the second step S2, a blocking condition signal in response to the detection of the blocking condition is generated. In a further or last step S3, a gradual actuation of parking brake device 16 is controlled such that, in a moving condition of the motor vehicle 12, the gradual actuation of parking brake device 16 is reduced or stopped if the blocking condition signal is generated according to step S2.

Further, the brake system 12 according to FIG. 1 is configured to perform the method as mentioned above according to its steps S1 to S3.

REFERENCE SIGNS

10 Brake system
12 commercial vehicle
14 electronic control unit
16 parking brake device
18 wheel-blocking detection device
20 wheels
22 service brake device
24 sub-system
26 axle
26a front axle
26b rear axle
28a spring brake actuator
28b spring brake actuator
30a service brake actuator
30b service brake actuator
30c service brake actuator
30d service brake actuator
ABS anti-blocking system signal

The invention claimed is:

1. A brake system for a motor vehicle, comprising:
at least one electronic control unit;
at least one service brake device;
at least one parking brake device; and
at least one wheel-blocking detection device; wherein
the wheel-blocking detection device is configured to:
detect at least one blocking condition of one or more wheels of the motor vehicle,
generate at least one blocking condition signal in response to the detected blocking condition, and
transmit the blocking condition signal to the electronic control unit;
wherein the electronic control unit is configured to control the parking brake device such that, in a moving condition of the motor vehicle, at least one gradual actuation of the parking brake device is reduced or stopped when the blocking condition signal is generated,
wherein the gradual actuation of the parking brake device includes applying a gradually increasing or decreasing braking force generated by one or more spring brake actuators or cylinders resulting in a defined deceleration of the motor vehicle, wherein the electronic control unit is configured to control the parking brake device in response to an anti-blocking operation of the service brake device to reduce or stop the gradual actuation of the parking brake device while the electronic control unit is further configured to activate at least one automatic parking brake device blending function together with the service brake device, the wheel-blocking detection device is configured to detect the blocking condition based on at least one direct request provided by at least one sub-system of the motor vehicle, wherein the sub-systems of the motor vehicle comprise at least one of a suspension system, an air spring system and anti-skid control system and systems of the powertrain, wherein the electronic control unit is configured to completely stop and prevent restart of the gradual actuation of the parking brake device in a case in which the blocking condition signal exceeds a blocking signal threshold; and the electronic control unit is configured to determine whether an actuation amount of the parking brake device during the gradual actuation of the parking brake device is below a gradual actuation threshold, and in a case in which the blocking condition signal continues to be generated, continue to provide the gradual actuation of the parking brake.

2. The brake system according to claim 1, wherein the electronic control unit is configured to control the gradual actuation based on at least one service brake pedal position signal.

3. The brake system according to claim 2, wherein the electronic control unit is configured to control the gradual actuation based on the service brake pedal position signal when at least one circuit of the service brake device is defective.

4. The brake system according to claim 1, wherein the wheel-blocking detection device is configured to detect the blocking condition based on a general anti-blocking system signal provided by the service brake device.

5. The brake system according to claim 1, wherein the wheel-blocking detection device is configured to detect the blocking condition based on an anti-blocking system signal of at least one axle of the motor vehicle provided by the service brake device.

6. The brake system according to claim 1, wherein the wheel-blocking detection device is configured to detect the blocking condition based on at least one speed value of the one or more wheels of the motor vehicle.

7. The brake system according to claim 1, wherein the electronic control unit is configured to reduce or stop the gradual actuation of the parking brake device when the blocking condition signal is generated and when the electronic control unit, by its parking brake device blending function, is configured to automatically control the gradual actuation of the parking brake device in case of secondary braking.

8. The brake system according to claim 1, wherein the electronic control unit is configured to reduce or stop the gradual actuation of the parking brake device when the blocking condition signal is generated and when the gradual actuation of the parking brake device is controlled by a driver of the motor vehicle.

9. The brake system according to claim 1, wherein the electronic control unit is configured to reduce or stop the gradual actuation of parking brake device when the blocking condition signal is generated and when the sub-system of the motor vehicle is configured to request at least one gradual actuation of the parking brake device.

10. The brake system according to claim 1, wherein the electronic control unit is configured to control the parking brake device based on the configuration of spring chambers of the vehicle, and the electronic control unit is further configured to reduce and/or stop gradual actuation of the parking brake device only when a blocking is detected for a wheel and/or axle equipped with a spring chamber.

11. The brake system according to claim 1, wherein the vehicle is a commercial vehicle.

12. A method for operating at least one brake system for a motor vehicle, the brake system comprising at least one electronic control unit, at least one parking brake device and at least one wheel-blocking detection device, the method comprising the steps of:

detecting at least one blocking condition of one or more wheels of the motor vehicle;

generating at least one blocking condition signal in response to the detection of the blocking condition; and controlling the parking brake device in response to an anti-blocking operation of the service brake device to control at least one gradual actuation of the parking brake device such that, in a moving condition of the motor vehicle, the gradual actuation of the parking brake device is reduced or stopped when the blocking condition signal is generated, wherein the gradual actuation of the parking brake device includes applying a gradually increasing or decreasing braking force generated by one or more spring brake actuators or cylinders resulting in a defined deceleration of the motor vehicle, the brake system further comprising at least one service brake device, wherein the electronic control unit is configured to reduce or stop the gradual actuation of the parking brake device while the electronic control unit is further configured to activate at least one automatic parking brake device blending function together with the service brake device, the wheel-blocking detection device is configured to detect the blocking condition based on at least one direct request provided by at least one sub-system of the motor vehicle, wherein the sub-systems of the motor vehicle comprise at least one of a suspension system, an air spring system and anti-skid control system and systems of the powertrain, wherein the electronic control unit is configured to completely stop and prevent restart of the gradual actuation of the parking brake device in a case in which the blocking condition signal exceeds a blocking signal threshold, and the electronic control unit is configured to determine whether an actuation amount of the parking brake device during the gradual actuation of the parking brake device is below a gradual actuation threshold, and in a case in which the blocking condition signal continues to be generated, continue to provide the gradual actuation of the parking brake.

* * * * *